J. R. MOFFATT AND A. H. SIMMONS.
DEVICE FOR POSITIONING LOOPERS OF SEWING MACHINES FOR THREADING.
APPLICATION FILED DEC. 18, 1917.
1,403,093.
Patented Jan. 10, 1922.
9 SHEETS—SHEET 1.
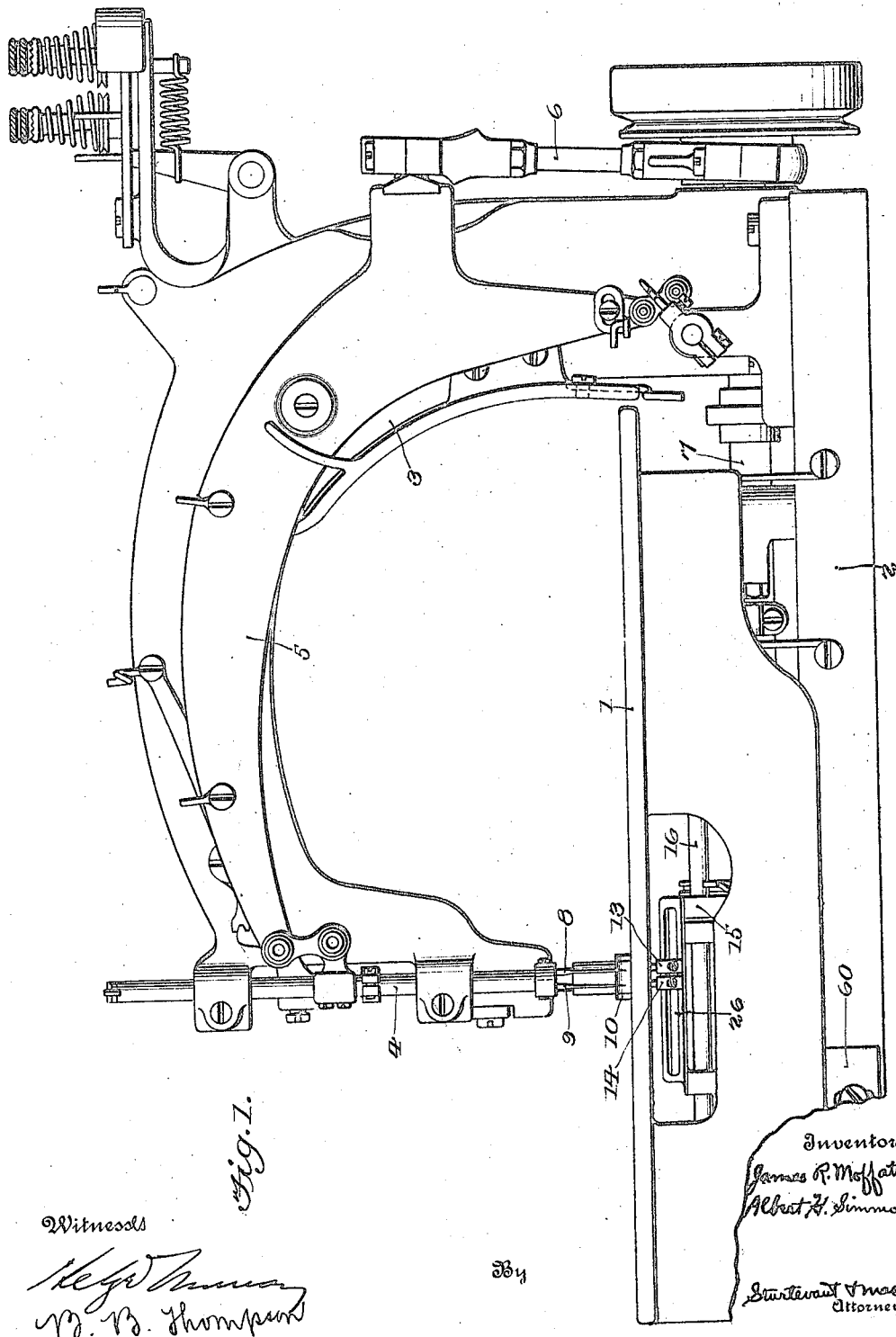

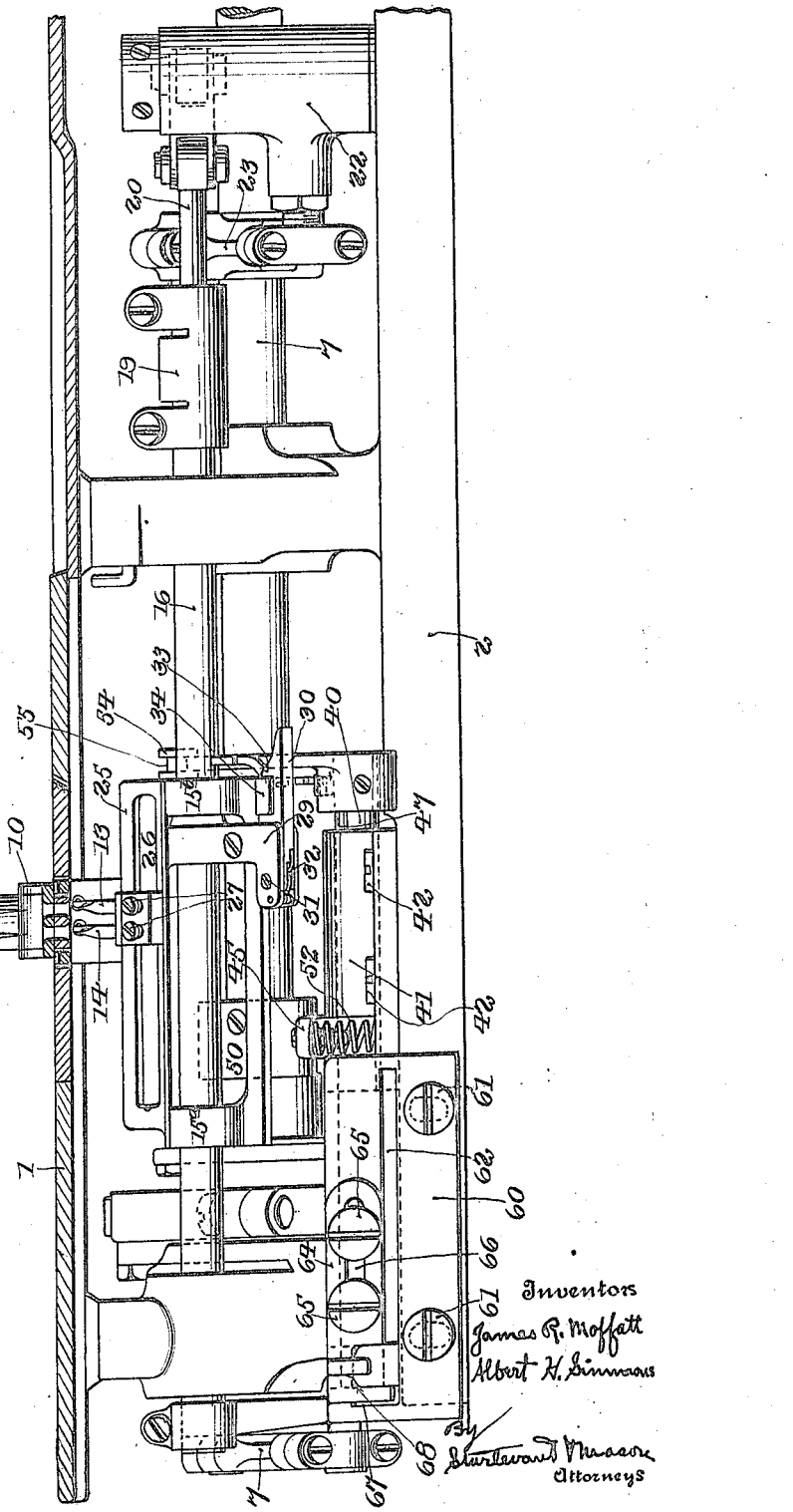

J. R. MOFFATT AND A. H. SIMMONS.
DEVICE FOR POSITIONING LOOPERS OF SEWING MACHINES FOR THREADING.
APPLICATION FILED DEC. 18, 1917.
1,403,093. Patented Jan. 10, 1922.
9 SHEETS—SHEET 3.
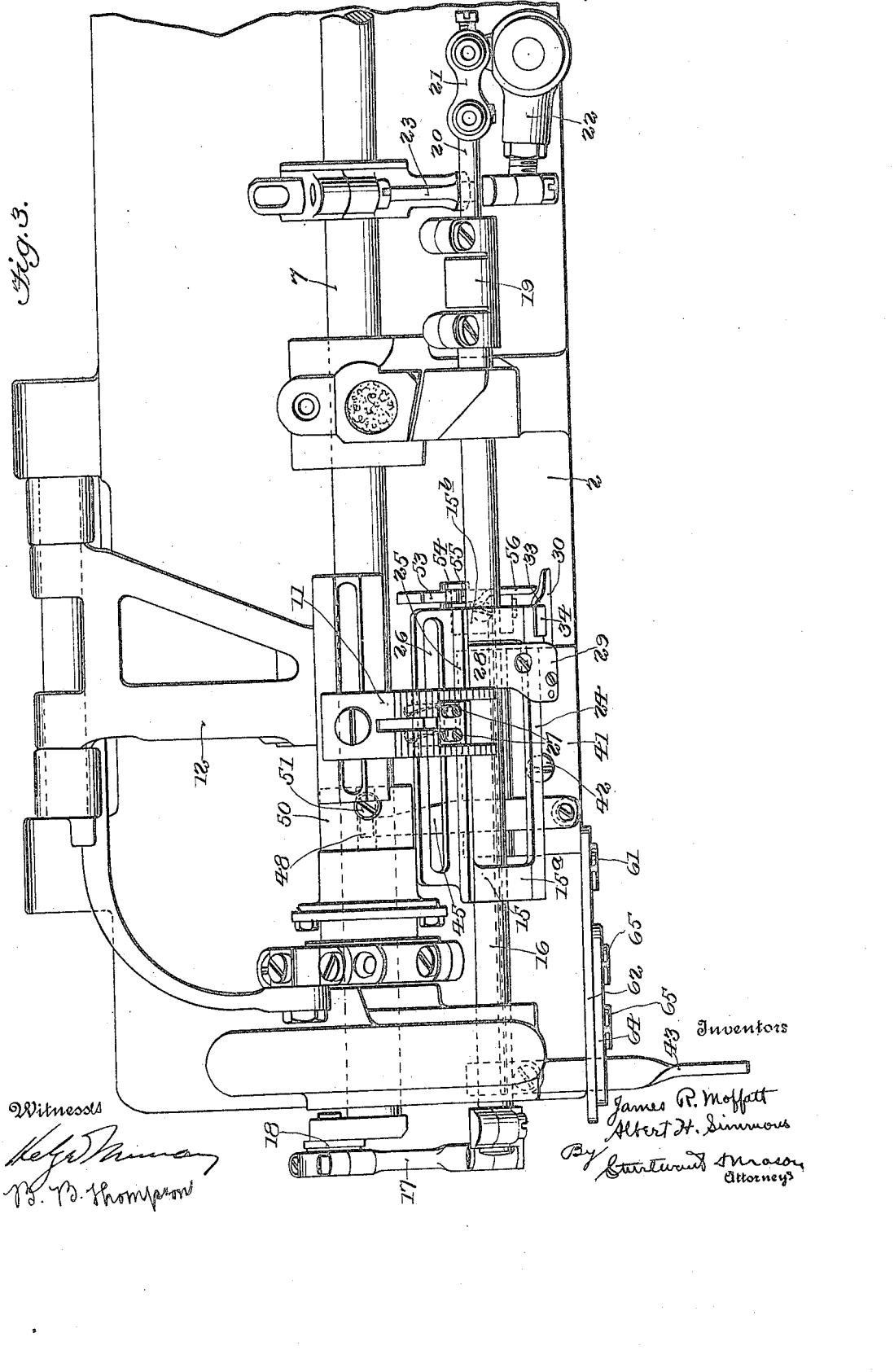

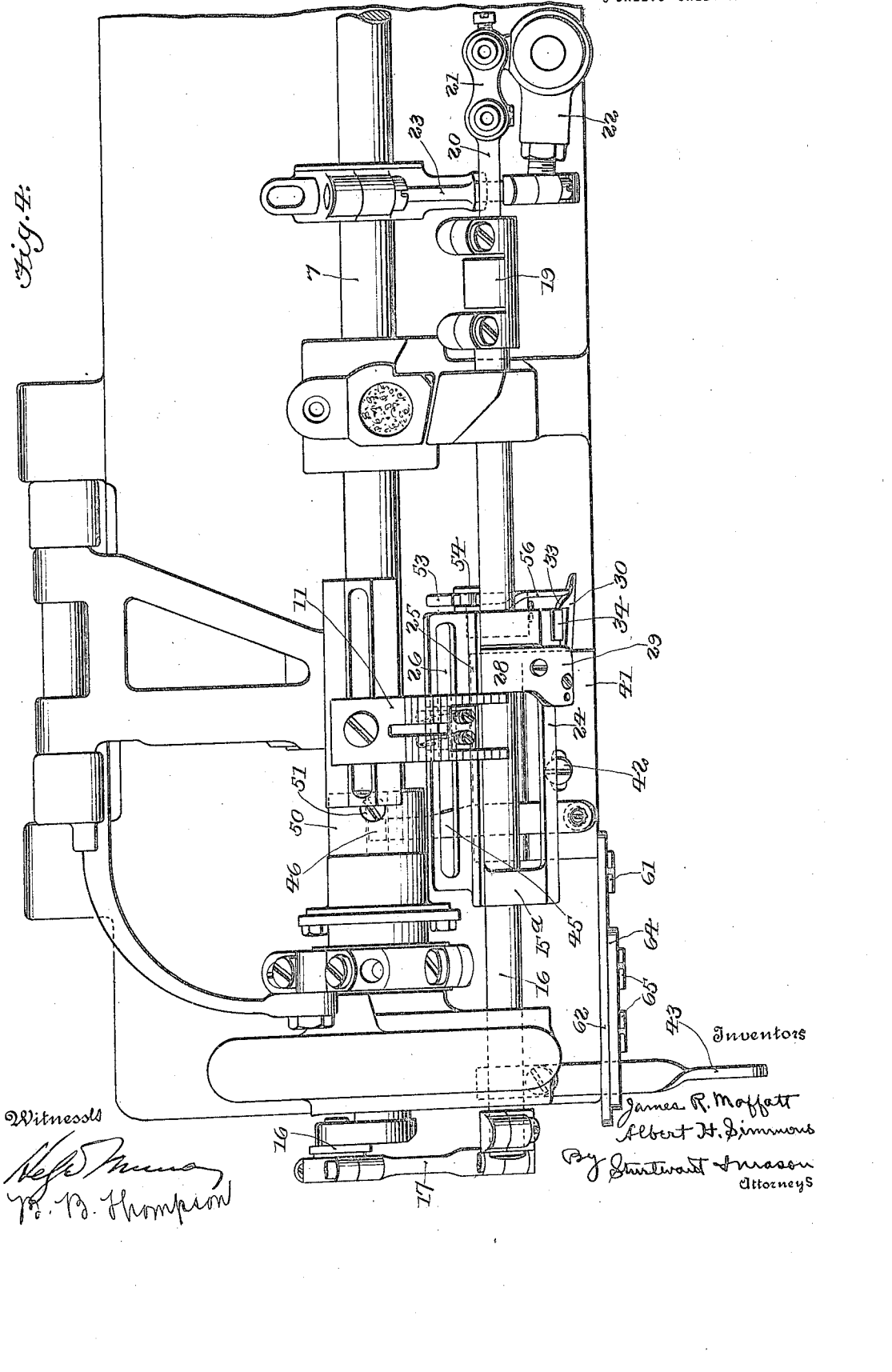

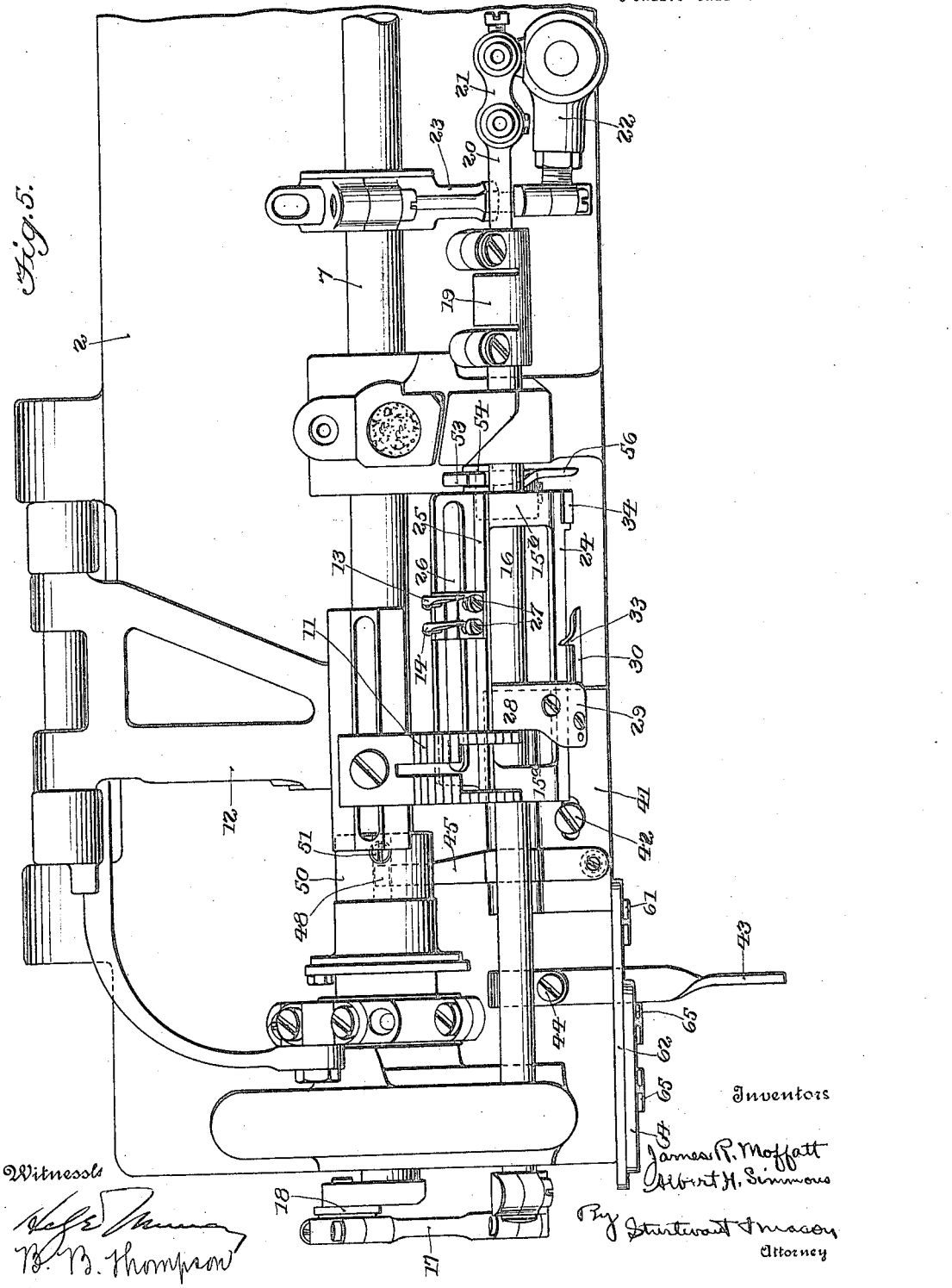

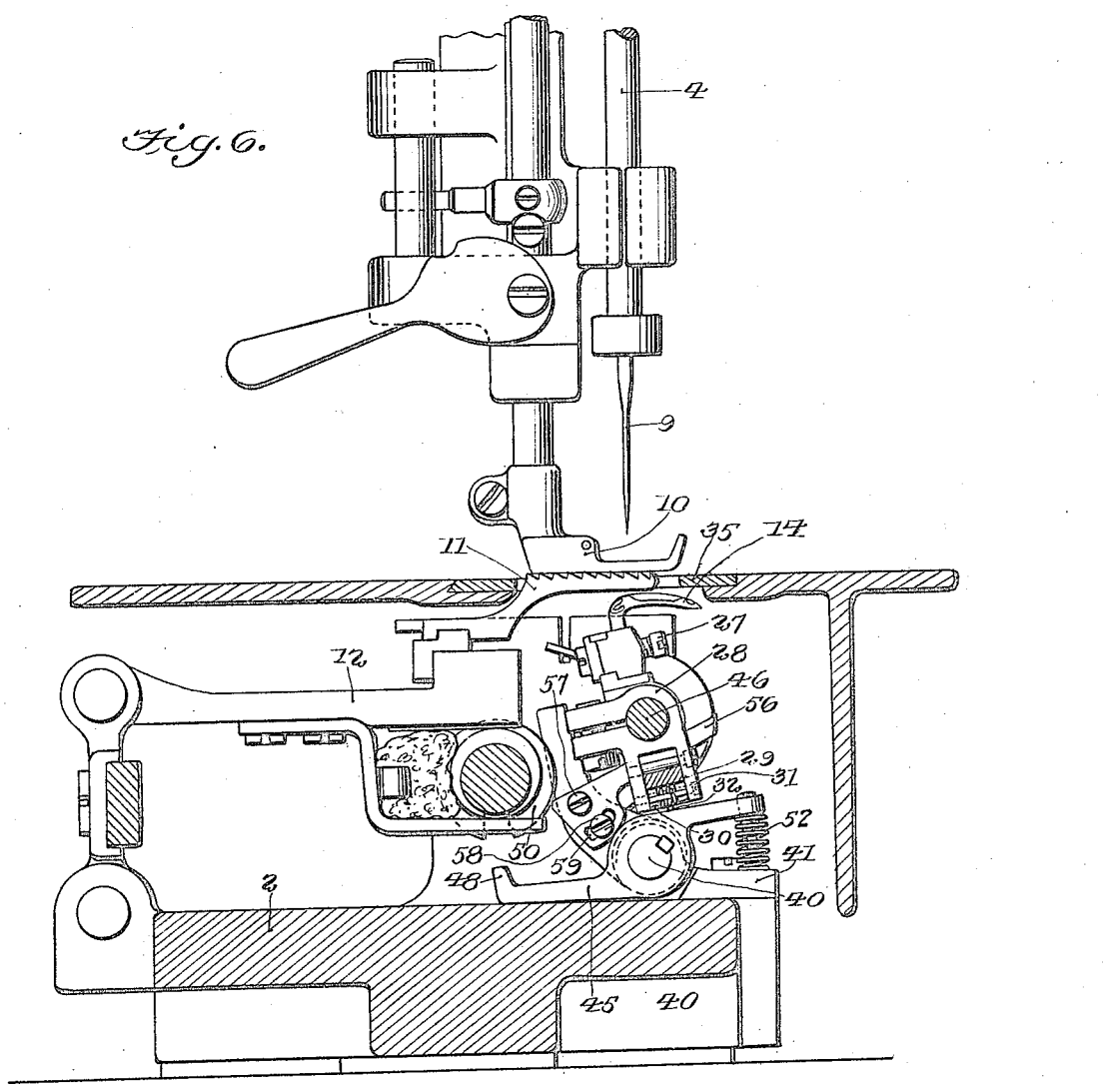

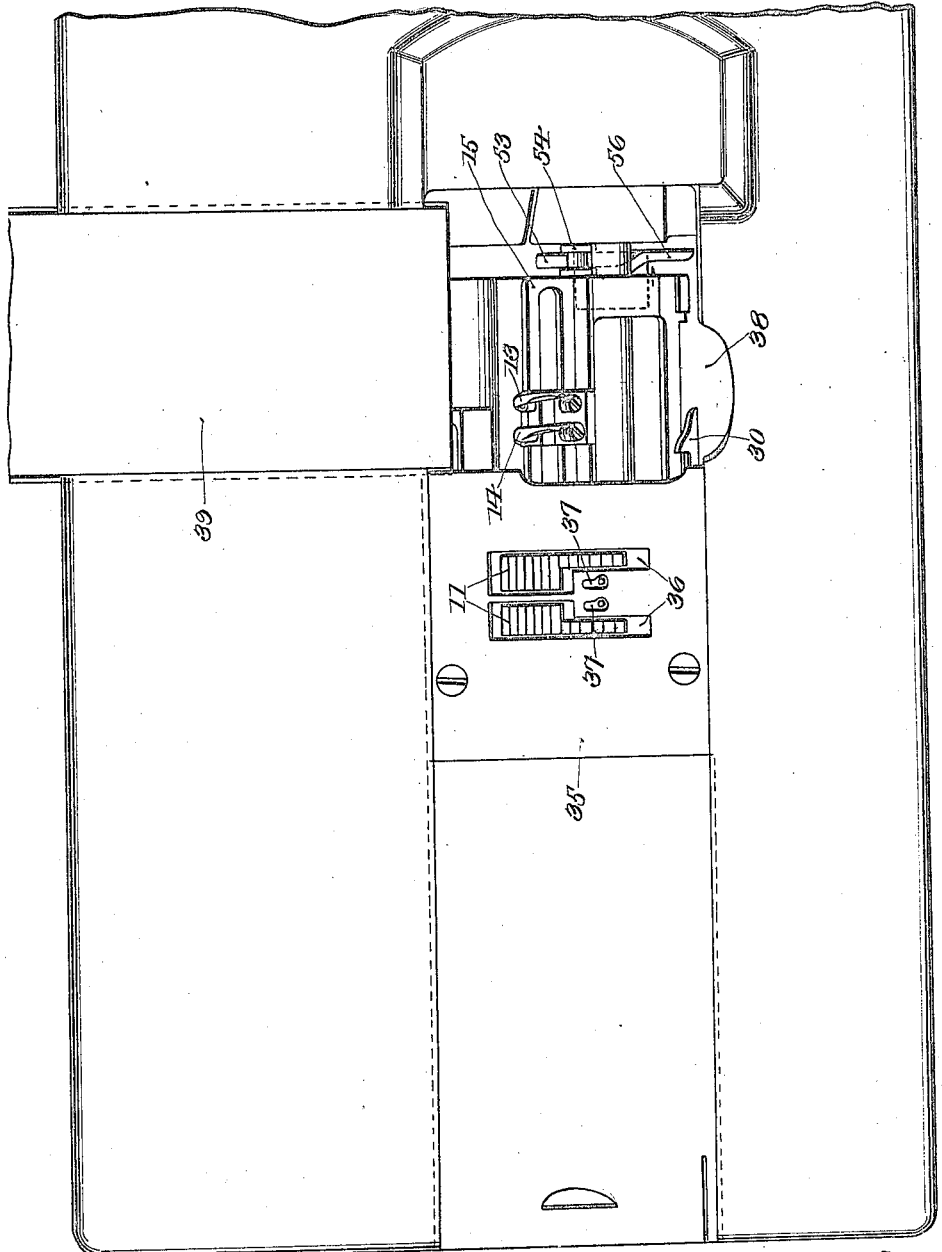

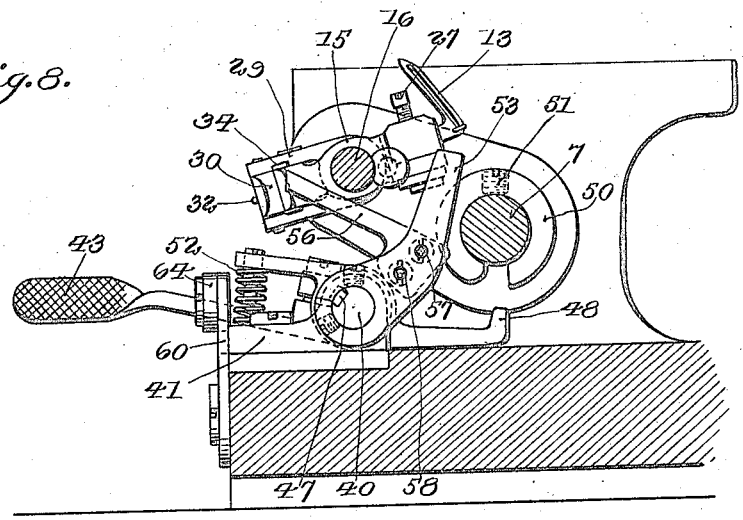
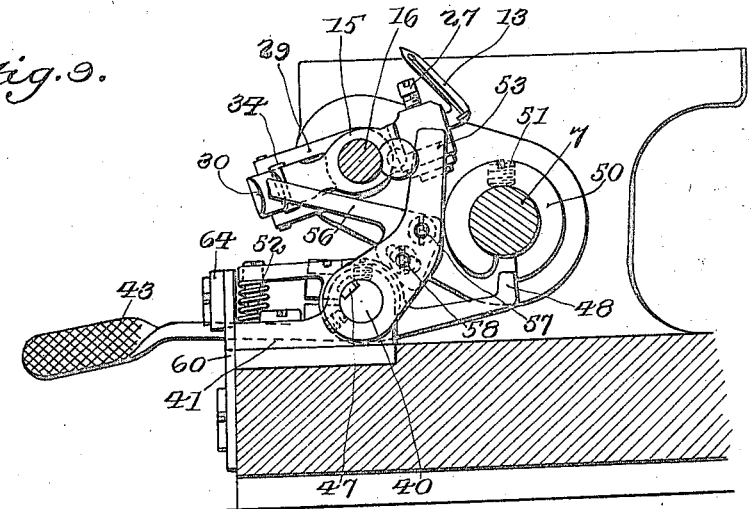

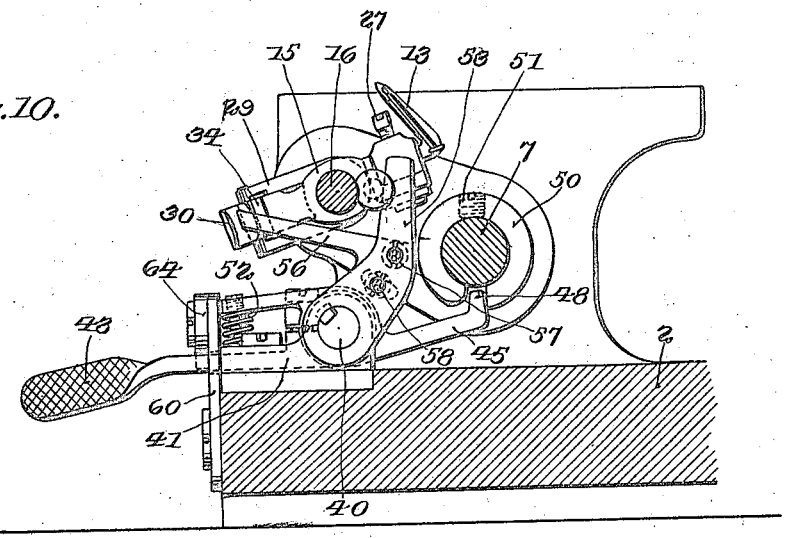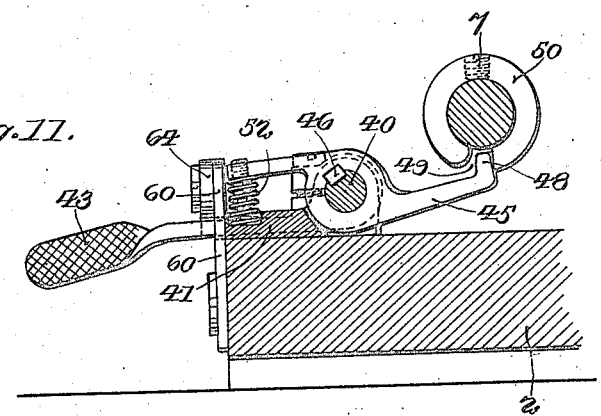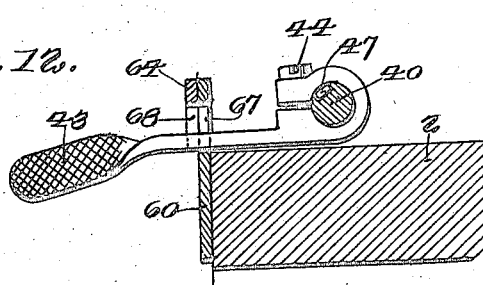

UNITED STATES PATENT OFFICE.

JAMES R. MOFFATT AND ALBERT H. SIMMONS, OF CHICAGO, ILLINOIS, ASSIGNORS TO UNION SPECIAL MACHINE COMPANY, OF CHICAGO, ILLINOIS, A CORPORATION OF ILLINOIS.

DEVICE FOR POSITIONING LOOPERS OF SEWING MACHINES FOR THREADING.

1,403,093.          Specification of Letters Patent.     Patented Jan. 10, 1922.

Application filed December 18, 1917. Serial No. 207,663.

*To all whom it may concern:*

Be it known that we, JAMES R. MOFFATT and ALBERT H. SIMMONS, citizens of the United States, residing at Chicago in the county of Cook, State of Illinois, have invented certain new and useful Improvements in Devices for Positioning Loopers of Sewing Machines for Threading, of which the following is a description, reference being had to the accompanying drawing, and to the figures of reference marked thereon.

The invention relates to new and useful improvements in sewing machines of the type shown in the patent granted to S. G. Tate, September 16, 1919, No. 1,316,400, and more particularly to devices for moving the looper from its normal operating position to a position at one side of the throat plate to facilitate threading of the looper.

An object of the invention is to provide a simplified construction wherein the operating shaft may be locked, the retaining means for the looper released and the looper positively moved by rigidly acting devices from operative position to threading position and returned to operative position.

A further object of the invention is to provide a construction wherein the locking of the shaft the releasing of the retaining means and the shifting of the looper may all be brought about through a single hand operated member and devices controlled thereby.

These and other objects will in part be obvious and will in part be hereinafter more fully disclosed.

In the drawings, which show by way of illustration, one embodiment of the invention,—

Figure 1 is a front view of a sewing machine to which the invention is applied;

Fig. 2 is an enlarged view in vertical section through the work support and showing the parts beneath the same in front elevation;

Fig. 3 is a top plan view of the parts beneath the work support showing the looper locked in normal position for co-operation with the needle;

Fig. 4 is a view similar to Fig. 3, but showing the retaining means as moved so as to release the looper carrier and the means for shifting the looper carrier brought into engagement therewith;

Fig. 5 is a view similar to Fig. 3 but showing the looper carrier shifted to position the looper for threading;

Fig. 6 is a view in vertical section substantially on the line of feed, showing principally the parts beneath the work support;

Fig. 7 is a view showing the work support in plan and the cover slide moved back so that access may be had to the loopers;

Fig. 8 is a vertical sectional view through the bed plate showing the means for locking the shaft, releasing the latch and for moving the looper carrier endwise in side elevation with the parts in idle position, that is disengaged from the latch and the operating shaft;

Fig. 9 is a similar view but showing the hand operated parts shifted so as to release the latch, engage the looper carrier and lock the shaft;

Fig. 10 is a view similar to Fig. 8, but showing the hand operated parts moved to full releasing and locking position;

Fig. 11 is a view in vertical section, through the bed plate, showing the locking lever and the hand operated member therefor with the parts in position for locking the shaft from turning;

Fig. 12 is a vertical section through the bed plate showing the hand operated member for shifting the parts.

Fig. 13 is a perspective view of the locking plates.

The invention is particularly adapted for a sewing machine having a thread carrying looper co-operating with a needle for forming double locked chain stitches. The thread carrying looper is mounted on the carrier, which in turn, is mounted on a carrier support. The carrier is connected to the support so that it is capable of endwise movement thereon but is always oscillated with the support. A latch operates to hold the carrier in normal position to co-operate with the needle. Our improvement consists in the means for releasing the latch, locking the machine against movement and for sliding the looper carrier to position the looper so that it may readily be reached for threading. In the present embodiment of the invention, the devices for accomplishing this function include a slidable rock shaft having an integral arm serving as the operating member for oscillating the shaft and moving the same endwise. Mounted on the shaft is a locking member which engages the main shaft of the machine to lock the machine against operation while the looper is shifted from normal co-operative position with the needle. Also mounted on the rock shaft and moving endwise therewith is a releasing finger which engages and releases the latch which holds the looper carrier in normal operative position and a second finger or arm which engages the looper carrier for positively moving the same to and from threading position.

Referring more in detail to the drawings, we have shown our invention as applied to a machine having a work support 1, and a bed plate 2 carrying an overhanging arm 3 in which a needle bar 4 reciprocates. The needle bar is reciprocated by a lever 5 which is oscillated by an eccentric strap 6 co-operating with an eccentric on the main shaft 7. The needle bar, as herein shown, is provided with two needles 8 and 9. The material is held on the work support by a presser foot 10 which is of the usual construction. The material is fed across the work support by a feed dog 11 which is carried by a feed bar 12 which is also of the usual construction and operated so as to impart the desired movement to the feed dog.

Co-operating with the needle 8 beneath the work support is a thread carrying looper 13 and co-operating with the needle 9 is a thread carrying looper 14. It will be understood that a single looper and needle may be used or more than two needles and co-operating loopers may be used. The number of needles and co-operating loopers has nothing to do with our invention except that when the number of needles are multiplied and arranged in the line of feed, as shown in the drawings, the difficulties in threading the loopers are increased. The invention is directed particularly to this type of machine where the loopers move in the line of feed and resides in the means for shifting the loopers to a position where they may be easily reached for threading.

The loopers 13 and 14 are mounted on a looper carrier 15. This looper carrier is in turn mounted on a looper carrier support 16. The support 16 is in the form of a shaft mounted in suitable bearings carried by the bed plate 2. This looper carrier support is oscillated by a link 17 which engages a crank 18 on the forward end of the main shaft 7. The looper carrier support 16 is also moved endwise for giving the looper its lateral or needle avoiding movement, by means of a sleeve 19 which is secured to the inner end of the looper carrier support 16. A rod 20 is attached to this sleeve and said rod is connected by a link 21 to a rock lever 22. This rock lever 22 is in turn connected to an eccentric strap 23 which co-operates with an eccentric on the main shaft 7. These devices for oscillating the looper carrier support and for moving the same endwise are well known in the art and form no part of the present invention. The looper carrier 15 consists of two spaced collars $15^a$ and $15^b$ which are connected by bars 24 and 25 to form the looper carrier. The bar 25 extends laterally from the collars and is formed with a slot 26. The loopers 13 and 14 are attached to this bar 25 and are secured thereto by screws 27 which pass through the slot 26. The collars $15^a$ and $15^b$ are free on the looper carrier support 16. Clamped to the looper carrier support 16 is another collar 28 which has a laterally projecting forked extension 29 which straddles the bar 24. The bar 24 is capable of sliding endwise in the forked extension 29 but this collar 28 with its forked extension is rigidly secured to the looper carrier support 16 and, therefore, causes the looper carrier to oscillate with the looper carrier support. When the looper carrier 15 is in position so that the loopers co-operate with the needles, the collar $15^b$ is brought into contact with the collar 28. The collar is locked in this position by a latch 30. This latch 30 is pivoted between the forks of the extension 29. Said latch is carried by a pivot screw 31 and a spring 32 operates to force the latch so as to hold its locking lip 33 in engagement with the shoulder 34 on the collar $15^b$, of the looper carrier. When the parts are in this position the carrier is locked both as to endwise movement on the looper carrier support 16 and also as to oscillating movement thereon and will, therefore, oscillate with the support and move laterally as the support moves endwise.

The work support 1 (see Fig. 7) carries a throat plate 35 having feed slots 36 through which the feed dog 11 operates. Said throat plate also has needle openings 37 through which the needles operate. Each looper moves in a vertical plane parallel with the line of feed and are during their entire movement beneath the throat plate so that it is very difficult to thread the same when in their operative position. The work support is provided with an opening 38 at one side of the throat plate 35 and this opening 38 is closed by a cover plate 39. When the latch 30 is released the looper carrier may be moved endwise on the looper carrier support 16 so as to bring the loopers 13 and 14 underneath the opening 38 in the cloth plate, as clearly shown in Fig. 6 of the drawings and when so positioned, they are readily accessible for threading.

The means for locking the machine against movement, for releasing the latch and for moving the looper carrier endwise on the looper carrier support, consists of a rock shaft 40 which is mounted to oscillate and to slide endwise in a bracket 41 adjustably secured by screws 42 to the bed plate 2. This rock shaft has a hand operated member or lever 43 rigidly secured at one end thereof by means of a split collar and clamping screw 44, (see Fig. 12). The bracket 41 has a cut out section in which is placed a locking lever 45. This locking lever is fulcrumed on the rock shaft 40 and is keyed thereto by a spline 46 engaging a groove 47 extending from end to end of the rock shaft. Through this splined connection it will be apparent that the rock shaft 40 may slide endwise in the bracket and through the lever 45 but any oscillating movements of the rock shaft must be imparted to the lever 45. One end of the lever 45 is formed with a locking lug 48 which is adapted to engage a groove 49 in a collar 50 secured to the main shaft by a set screw 51. The other end of the lever 45 overhangs the bracket 41 and a spring 52 seated on the bracket engages the outer end of this portion of the lever and normally swings the lever in a clockwise direction as viewed in Fig. 8, which would withdraw the locking lug 48 from the groove 49.

Mounted on the opposite end of the rock shaft 40, from the hand member 43, is an arm 53. This arm is rigid with the rock shaft and oscillates with the rock shaft and is also moved endwise therewith. The looper carrier 15 has an extension 54 which is formed with an annular groove 55. The arm 53 is adapted to engage said groove 55 when the rock shaft 40 is turned in a counter-clockwise direction through the depression of the hand member 43. Mounted on this arm 53 is a finger 56. Said finger is adjustably secured thereto by screws 57 and 58, (see Fig. 6), the shank of the finger being slotted at 59 for the screw 58 so as to permit the finger to be swung about the screw 57 for adjustment. This finger is adapted to engage the latch 30 and move the latch out of engagement with its locking shoulder on the looper carrier when the hand member 43 is depressed so as to swing the rock shaft in a counter-clockwise direction.

From the above it will be apparent that when the hand member 43 is depressed the locking lever will engage the main shaft and lock the same against turning, the arm 53 will engage the looper carrier and the finger 56 will release the latch. With the parts held in this position the rock shaft 40 is moved endwise which will slide the looper carrier on the looper carrier support 16 and this brings the loopers to threading position. A movement in the opposite direction brings the looper carrier back to normal operative position, after which the latch is released, the arm is moved out of engagement with the carrier and the main shaft released so that it may be rotated.

When the locking lug 48 is out of engagement with the slot 49 it lies close to the face of the collar 50 and would serve as a means for preventing the hand lever being depressed except when the slot 49 is in register with said locking lug. At this time the loopers are retracted, are out of the needle loops and back from the needles so that they may be readily moved laterally for threading and this is the only time in which the looper carrier may be released through our improved controlling devices and moved laterally for threading.

Mounted on the bed plate 2 is a stop plate 60 which is adjustably secured thereto by screws 61 so that it may be adjusted vertically. This stop plate has a horizontal slot 62 therein which extends throughout a greater portion of its length, and a vertical slot 63 which is located adjacent one end of the horizontal slot. The vertical slot 63 is directly over the hand lever 43 when the rock shaft is in position for the arm 53 to engage the looper carrier. This vertical slot 63 is made a little wider than the hand operated member 43 and a second plate 64 is secured to the first stop plate by screws 65. This second plate has a slot 66 through which the screws extend and this permits the plate 64 to be moved endwise or in a direction parallel with the horizontal slot 62. The outer end of the plate 64 is formed with a slot 67 which is substantially the width of the hand operated member 43 and by adjusting this plate 64 the initial position of this hand operated member may be adjusted and thus the arm 53 brought to a position so as to properly engage the groove 55. It will be apparent that when the hand operated member is in its raised position, which is brought about through the spring 52 turning the lever 45 and thus turning the rock shaft 40, said hand operated member 43 cannot be moved laterally or the rock shaft 40 endwise. When however, it is depressed or moved to its extreme lower position, then it is in register with the slot 62 and can freely move laterally therein or endwise of the slot. If the hand operated member 43 is moved laterally from its initial position, it cannot return to raised position on account of the stop plate 60 holding the same down. The result of this construction is as follows. The hand operated member 43 can only be depressed when the shaft stops in such a position that the locking lug 48 can engage the groove 49 in the collar 50. When it is depressed, the oscillation of the rock shaft 40 not only locks the main shaft but releases the latch 30 and causes the arm 53 to engage the looper carrier. While the parts are in this position then the hand operated member may be moved laterally in the slot 62 and the looper carrier shifted endwise on the looper carrier support. If, however, the operator releases this hand operated member 43 while the carrier is away from normal operative position the stop plate 60 will prevent the hand operated member from raising and releasing the main shaft, and therefore, the main shaft cannot be started until this hand operated member 43 has been returned to the extreme left hand end of the slot 62 and in register with the vertical slot 68. This insures that the looper carrier will always be returned to operative position for the loopers before the machine can be released and it also insures that the machine will be stopped in proper position for shifting the loopers laterally before said carrier can be engaged by the hand operated member so as to be shifted.

It will be noted that the arm 53 is positively held in engagement with the looper carrier and will positively move the looper carrier so as to position the loopers for threading and for returning the loopers to their normal operative position.

It is obvious that minor changes in the details of construction can be made without departing from the spirit of the invention as set forth in the appended claims.

Having thus described our invention, what we claim as new and desire to secure by Letters Patent, is:—

1. A sewing machine including in combination, a needle, a thread carrying looper co-operating with said needle, a looper carrier on which the looper is mounted, a looper carrier support, means for operating the looper carrier support for imparting movements to the looper, retaining means for securing the carrier to said support, a manually operated member, rigidly acting devices controlled by said member for locking the carrier support against movement, for releasing the retaining means and for positively moving the looper carrier on its support to position the looper for threading and for returning said looper to normal operative position.

2. A sewing machine including in combination, a needle, a thread carrying looper co-operating with said needle, a looper carrier on which the looper is mounted, a looper carrier support, means for operating the looper carrier support for imparting movements to the looper, retaining means for securing the carrier to its support, a manually operated member and devices controlled by said member whereby a movement of said operated member in one direction locks the looper carrier support against movement and releases the retaining means, and whereby a movement of the hand operated member in another direction shifts the looper carrier to position the looper for threading.

3. A sewing machine including in combination, a needle, a thread carrying looper co-operating with said needle, a looper carrier on which the looper is mounted, a looper carrier support, means for operating the looper carrier support for imparting movements to the looper, retaining means for securing the carrier to said support, a rock shaft, a hand operated member for oscillating said rock shaft and for moving the same endwise, devices controlled by said rock shaft for locking the looper carrier support against movement, for releasing the retaining means and for moving said looper carrier to position the looper for threading.

4. A sewing machine including in combination, a needle, a thread carrying looper co-operating with said needle, a looper carrier on which the looper is mounted, a looper carrier support, means for operating the looper carrier support for imparting movements to the looper, retaining means for securing the carrier to said support, a rock shaft, a hand operated member for oscillating the same and for moving the rock shaft endwise, a locking lever controlled by said rock shaft for locking the looper carrier support against movement, an arm carried by the rock shaft for engaging the looper carrier for moving the same endwise with the rock shaft and a finger operated by said rock shaft for releasing the retaining means.

5. A sewing machine including in combination, a needle, a thread carrying looper co-operating with said needle, a looper carrier on which the looper is mounted, a looper carrier support, means for operating the looper carrier support for imparting movements to the looper, retaining means for securing the carrier to its support, a rock shaft, a hand operated member for oscillating the same and for moving the rock shaft endwise, a locking lever controlled by said rock shaft for locking the looper carrier support against movement, an arm carried by the rock shaft for engaging the looper carrier for moving the same endwise with the rock shaft and a finger operated by said rock shaft for releasing the retaining means, said finger being mounted on said arm whereby the same may be adjusted.

6. A sewing machine including in combination a main shaft, a needle, a thread carrying looper co-operating with said needle, a looper carrier on which the looper is mounted, a looper carrier support, means for operating the looper carrier support for imparting movements to the looper, retaining means for securing the carrier to its support, a rock shaft, an adjustable bracket in which the rock shaft oscillates and moves endwise, a locking lever splined to the rock shaft so as to oscillate therewith, said bracket being constructed to prevent said lever from moving laterally with the rock shaft, said locking lever having means for locking the main shaft against movement, a hand operated member for oscillating the rock shaft and for moving the same endwise and means controlled by the rock shaft for releasing the retaining means and for moving the carrier endwise when released.

7. A sewing machine including in combination a main shaft, a needle, a thread carrying looper co-operating with said needle, a looper carrier on which the looper is mounted, a looper carrier support, means for operating the looper carrier support for imparting movements to the looper, retaining means for securing the carrier to its support, a rock shaft, an adjustable bracket in which the rock shaft oscillates and moves endwise, a locking lever splined to the rock shaft so as to oscillate therewith, said bracket being constructed to prevent said lever from moving laterally with the rock shaft, said locking lever having means for locking the main shaft against movement, a hand operated member for oscillating the rock shaft and for moving the same endwise, an arm carried by said rock shaft and adapted to engage the looper carrier for moving the same endwise and a finger carried by said rock shaft for engaging and releasing the retaining means.

8. A sewing machine including in combination a main shaft, a needle, a thread carrying looper co-operating with said needle, a looper carrier on which the looper is mounted, a looper carrier support, means for operating the looper carrier support for imparting movements to the looper, retaining means for securing the carrier to its support, a rock shaft, an adjustable bracket in which the rock shaft oscillates and moves endwise, a locking lever splined to the rock shaft so as to oscillate therewith, said bracket being constructed to prevent said lever from moving laterally with the rock shaft, said locking lever having means for locking the main shaft against movement, a spring for turning said lever and rock shaft so as to normally hold the lever out of locking engagement with the main shaft.

9. A sewing machine including in combination a main shaft, a needle, a thread carrying looper co-operating with said needle, a looper carrier on which the looper is mounted, a looper carrier support, means for operating the looper carrier support for imparting movements to the looper, retaining means for securing the carrier to its support, a rock shaft, a supporting bracket therefor in which the rock shaft may oscillate and move endwise, means controlled by the oscillations of the rock shaft for locking the main shaft against movement, means controlled by the rock shaft for engaging and moving the carrier endwise in the looper carrier support, a hand operated member for oscillating the rock shaft and for moving the same endwise, a stop plate having a horizontal slot in which said hand operated member moves, said slot being shaped and positioned so as to hold said rock shaft with the machine locked against movement while the carrier is out of normal operative position.

10. A sewing machine including in combination a main shaft, a needle, a thread carrying looper co-operating with said needle, a looper carrier on which the looper is mounted, a looper carrier support, means for operating the looper carrier support for imparting movements to the looper, retaining means for securing the carrier to its support, a rock shaft, a supporting bracket therefor in which the rock shaft may oscillate and move endwise, means controlled by the oscillations of the rock shaft for locking the main shaft against movement, means controlled by the rock shaft for engaging and moving the carrier endwise in the looper carrier support, a hand operated member for oscillating the rock shaft and for moving the same endwise, a stop plate having a horizontal slot in which said hand operated member moves, said slot being shaped and positioned so as to hold said rock shaft with the machine locked against movement while the carrier is out of normal operative position, said stop plate having a vertical slot adjacent one end of the horizontal slot in which said hand operated member moves for causing the locking lever to release the main shaft.

11. A sewing machine including in combination a main shaft, a needle, a thread carrying looper co-operating with said needle, a looper carrier on which the looper is mounted, a looper carrier support, means for operating the looper carrier support for imparting movements to the looper, retaining means for securing the carrier to its support, a rock shaft, a supporting bracket therefor in which the rock shaft may oscillate and move endwise, means controlled by the oscillations of the rock shaft for locking the main shaft against movement, means controlled by the rock shaft for engaging and moving the carrier endwise in the looper carrier support, a hand operated member for oscillating the rock shaft and for moving the same endwise, a stop plate having a horizontal slot in which said hand operated member moves, said slot being shaped and positioned so as to hold said rock shaft with the machine locked against movement while the carrier is out of normal operative position, said stop plate having a vertical slot adjacent one end of the horizontal slot in which said hand operated member moves for causing the locking lever to release the main shaft, a second plate carried by the stop plate and adjustable lengthwise of the horizontal slot, said second plate having a vertical slot adapted to receive the hand operated member.

In testimony whereof we affix our signatures, in the presence of two witnesses.

JAMES R. MOFFATT.
ALBERT H. SIMMONS.

Witnesses:
GERALD MAHONY,
S. GEORGE TATE.